(12) United States Patent
Mitchell

(10) Patent No.: US 7,887,007 B2
(45) Date of Patent: Feb. 15, 2011

(54) HIGH-ALTITUDE LONG-ENDURANCE AIRSHIP

(76) Inventor: Matthew P. Mitchell, 151 Alvarado Rd., Berkeley, CA (US) 94705-1510

( * ) Notice: Subject to any disclaimer, the term of this patent is extended or adjusted under 35 U.S.C. 154(b) by 560 days.

(21) Appl. No.: 12/069,308

(22) Filed: Feb. 8, 2008

(65) Prior Publication Data

US 2009/0200417 A1 Aug. 13, 2009

(51) Int. Cl.
*B64B 1/02* (2006.01)
(52) U.S. Cl. .............................. 244/30; 244/96; 244/97
(58) Field of Classification Search .................. 244/30, 244/96, 97, 31
See application file for complete search history.

(56) References Cited

U.S. PATENT DOCUMENTS

| | | | |
|---|---|---|---|
| 4,052,025 A | 10/1977 | Clark | |
| 5,005,783 A | 4/1991 | Taylor | |
| 5,034,751 A | 7/1991 | Miller | |
| 5,240,206 A | 8/1993 | Omiya | |
| 5,890,676 A | 4/1999 | Coleman | |
| 6,119,979 A * | 9/2000 | Lee et al. | 244/97 |
| 6,290,176 B1 | 9/2001 | Hankinson | |
| 6,311,925 B1 | 11/2001 | Rist | |
| 6,386,480 B1 * | 5/2002 | Perry et al. | 244/24 |
| 6,425,552 B1 * | 7/2002 | Lee et al. | 244/97 |
| 6,581,873 B2 | 6/2003 | McDermott | |
| 6,607,163 B2 | 8/2003 | Perry | |
| 6,837,458 B2 | 1/2005 | Swearingen | |
| 6,848,647 B2 | 2/2005 | Albrecht | |
| 7,093,789 B2 * | 8/2006 | Barocela et al. | 244/30 |
| 7,438,261 B2 * | 10/2008 | Porter | 244/31 |
| 2002/0005457 A1 * | 1/2002 | Lee et al. | 244/30 |
| 2009/0189015 A1 * | 7/2009 | Alavi | 244/97 |
| 2009/0272841 A1 * | 11/2009 | Sinsabaugh et al. | 244/30 |
| 2010/0056666 A1 * | 3/2010 | Poe et al. | 523/135 |
| 2010/0101628 A1 * | 4/2010 | Poe et al. | 136/244 |

OTHER PUBLICATIONS

C. D. West, Liquid Piston Stirling Engines, 1983, pp. 10-12, Van Nostrand.
John McFee, The Deltoid Pumpkin Seed, 1973, pp. 100-101, 1973, Farrar, Strauss and Giroux.
Michael S. Smith, "Test Flights of the Revised ULDB Design" date unkown, from internet, AIAA, 8 pages.
David Cadogan et al, "Inflatable and Rigidized Wings for Unmanned Aerial Vehicles", date unknown, from internet, AIAA, 9 pages.

(Continued)

*Primary Examiner*—Christopher P Ellis

(57) ABSTRACT

A high-altitude long-endurance airship with a top surface that is highly emissive of infrared radiation and a bottom surface that is highly absorptive of infrared radiation. Movable displacer blankets inside the airship separate the upper and lower portions of the airship. Lifting gas in the airship is warmed by radiation from the earth when the displacer blankets are in their upper position. Lifting gas is cooled by radiation to space when the displacer blankets are in their lower position. The whole airship is a heat engine. By expanding the volume of lifting gas when it is relatively warm and compressing the lifting gas when it is relatively cold, net power output can be recovered in the form of electric power. The overall configuration of the preferred airship is a variable-thickness flying wing. If the whole airship is alternately expanded and compressed, imbalance between its weight and buoyancy allow gliding flight.

15 Claims, 7 Drawing Sheets

OTHER PUBLICATIONS

"Researchers give new hybrid vehicle its first test drive in the ocean", Feb. 7, 2008, EurekAlert, internet, 3 pages.

William B. Scott, "The Fringe of Space" Jan. 30, 2006, Aviation Week & Space Technology, p. 60.

Popular Mechanics, "4 new 'Blimp' Designs Bring Return of the Airship", Jan. 6, 2008, pp. 1-4, from internet.

Anthony Colozza, et al., "High-Altitude, Long-Endurance Airships for Coastal Surveillance", Feb. 2005, NASA/TM—2005-213427, 15 pages.

* cited by examiner

HIGH-ALTITUDE LONG-ENDURANCE AIRSHIP

CROSS-REFERENCE TO RELATED APPLICATIONS

Not applicable

SEQUENCE LISTING OR PROGRAM

Not Applicable.

FEDERALLY SPONSORED RESEARCH

Not applicable

BACKGROUND

1. Field of Invention

This invention relates to airships intended to be stationed at high altitudes for extended periods of time.

2. Prior Art

High-altitude, long-endurance airships have been proposed as alternatives to satellites as less expensive platforms for surveillance and communications applications. Charged with a lifting gas such as hydrogen or helium, an airship can rise high above the earth, providing a wide area of coverage. Typical altitudes are above the tropopause, at altitudes of the order of 20-22 km above the earth, and above cloud cover. Automatic control systems linked to global positioning satellites allow uninhabited operation.

A major challenge is to keep an airship more or less over the same spot on earth. Absent some means of propulsion, winds aloft would otherwise cause the airship to drift from its intended location. To maintain its station, the airship must constantly fly into the wind at wind velocity.

During daylight hours, the airship has access to solar power. That power can be captured by solar cells and used to drive propellers with electric motors to propel the airship. However, powering the airship at night presents a serious problem.

Various schemes have been proposed for storing solar energy generated during daylight hours for use at night. They include such energy-storage devices as batteries and regenerative fuel cells. However, the buoyancy of an airship is limited by the weight of the air it displaces. At proposed operating altitudes, the air density is low and most of the lifting capacity of the airship is used in supporting the weight of airship itself. No energy storage system yet devised is light enough to store all the power needed for station-keeping at night.

BRIEF SUMMARY OF INVENTION

This invention solves the problem of propelling an airship at night with a system and apparatus for capture and use of energy radiated from the earth. The energy-capturing system is integrated into the overall airship design. The system is based on the realization that an airship floating above the tropopause at night has access to passive cooling by radiation to space. The airship is also subject to heating by energy radiated from the earth below. The airship of this invention uses the energy radiated from the earth to generate propulsive power. The enabling conditions at altitudes of interest include: A heat source (infrared radiation from earth); a heat sink (outer space); low air pressure; lower average wind speeds than at lower and higher altitudes; high Reynolds numbers (due to the large dimensions of the airship); and high thermal conductivity of the lifting gas relative to thermal conductivity of air.

By alternately heating and cooling the lifting gas in the airship, expanding the lifting gas when it is relatively warm and compressing the lifting gas when it is relatively cold, net power output can be recovered The whole airship is, itself, a heat engine. The overall configuration of the preferred airship is a variable-thickness flying wing.

Recovered energy may be employed in two ways: (1) as direct mechanical power, convertible to electric power, and (2) as buoyancy changes that power forward glide. To obtain continuous output of electric power, the airship is configured as a number of separate volumes that are independently compressed and expanded out of phase with each other. The compression-expansion cycle of the volumes is timed so that some volumes are always expanding and thus producing power while other volumes are being compressed.

If the entire airship is configured to contain a single volume of lifting gas, changes in that volume produce substantial changes in buoyancy, allowing for forward glide whenever the buoyancy of the airship and its weight are out of balance.

For maximum absorption of heat radiated from the earth by the bottom surface of the airship, that surface is fabricated or coated to approach the absorptivity of a "black body" at temperatures of the order of 250 to 275 Kelvin. For maximum effectiveness in radiating heat from the upper surface of the airship to space, that upper surface is fabricated or coated to approach the emissivity of a "black body" at temperatures of the order of 175 to 200 Kelvin.

To cause lifting gas to be alternately warmed and cooled, moveable, insulating displacer blankets are contained in the compartments of the airship. When those displacer blankets are raised, most of the lifting gas is situated below them and is warmed by radiation that heats the lower surface of the airship. When those displacer blankets are lowered, most of the lifting gas moves above them, where it transfers heat to the upper surface of the airship which in turn radiates that heat to space. Openings in, or around the edges, of the displacer blankets permit lifting gas to move from below the displacer blankets to above the displacer blankets and back again as the displacer blankets are raised and lowered. Natural convection conveys heat from the lower surface of the airship to the lifting gas; natural convection likewise conveys heat from the lifting gas to the upper surface of the airship.

The volume of the airship may be varied by reeling in or unreeling cables that pass through pulleys attached to catenary curtains affixed to the top and bottom surfaces of the airship, respectively. The cables are reeled out and in by winches that alternately drive and are driven by reversible motor/generators. If separate volumes of lifting gas are cycled independently, power can be generated continuously. If the airship contains a single volume of lifting gas, power generated during expansion of that volume is stored by some conventional means such as batteries. That stored energy subsequently drives the motor/generators to turn the winches to reel in the cables.

As the cables are unreeled, they drive the winches which in turn drive the reversible motor/generators to generate electric power. Because less work is required to reel in the cables than is obtained as they are reeled out, there is a net power output. If multiple volumes of lifting gas are cycled independently, power can be generated continuously and no energy storage is required. If a single volume of lifting gas is employed, the amount of energy that is stored and recovered over a cycle is a fraction of the energy that would have to be stored to power the airship throughout the night and the energy storage means can be correspondingly light in weight.

Altering the volume of the entire airship changes its buoyancy. Imbalance between the weight of the airship and the weight of the air it displaces creates the opportunity for gliding flight. In that way, forward motion can be obtained without recourse to the electrically-powered propellers. The combination of forward glide generated by weight imbalances and thrust from electrically-driven propellers allows forward flight in a band of altitude.

Alternatively, flight may be maintained at nearly-constant altitude by cycling the volume of different lobes of the airship separately, so that some lobes are being compressed as others are expanding. In that way, the overall volume of the airship, and hence its buoyancy, may be maintained substantially constant throughout the night. That mode of operation dispenses with gliding flight but maintains substantially continuous generation of electric power and thus eliminates the need for energy storage at night.

During daylight hours, all displacer blankets in the airship may be raised to their uppermost position, thereby insulating most of the lifting gas in the airship from solar heat absorbed during daylight hours. In that way, the temperature of most of the lifting gas can be held below the temperature that it would otherwise attain, and the super pressure in the airship can thus be maintained at a level below that which would be obtained in the absence of the displacer blankets.

OBJECTS

Several objects of this invention are:
(1) To harvest energy radiated from the earth to provide electric power to propel a high-altitude long-endurance airship and/or to power its on-board electrically-powered payload during hours of darkness.
(2) To minimize the energy storage requirements of a high-altitude long-endurance airship.
(3) To vary the volume of a high-altitude long-endurance airship so as to alter its buoyancy.
(4) To enable a high-altitude long-endurance airship to glide forward when its buoyancy and weight are out of balance.
(5) To move an insulating displacer blanket between the upper and lower regions of a high-altitude long-endurance airship.
(6) To insulate a high-altitude long-endurance airship from excessive heating by the sun during daylight hours.
(7) To reduce the radius of curvature of outside surfaces of a high-altitude long-endurance airship, thereby reducing hoop-stress in its envelope.
(8) To permit use of light-weight envelope materials in a high-altitude long-endurance airship

BRIEF DESCRIPTION OF DRAWING FIGURES

Figure 3A:
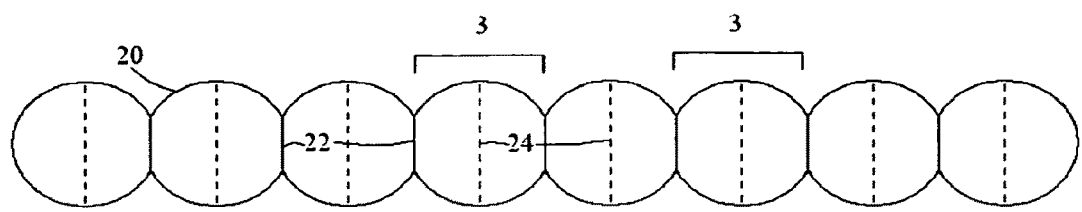
Figure 3B:
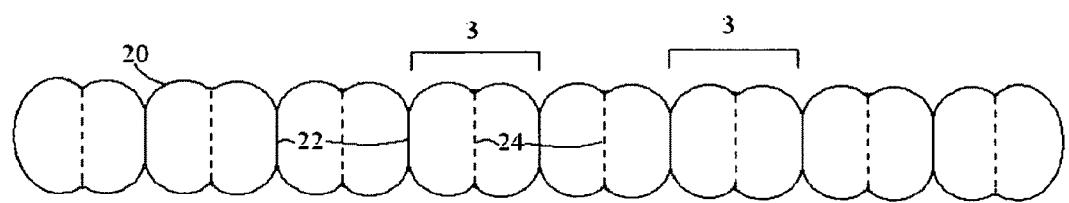
Figure 3C:
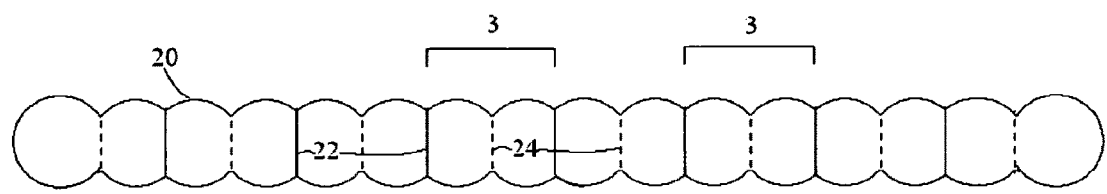
Figure 4:
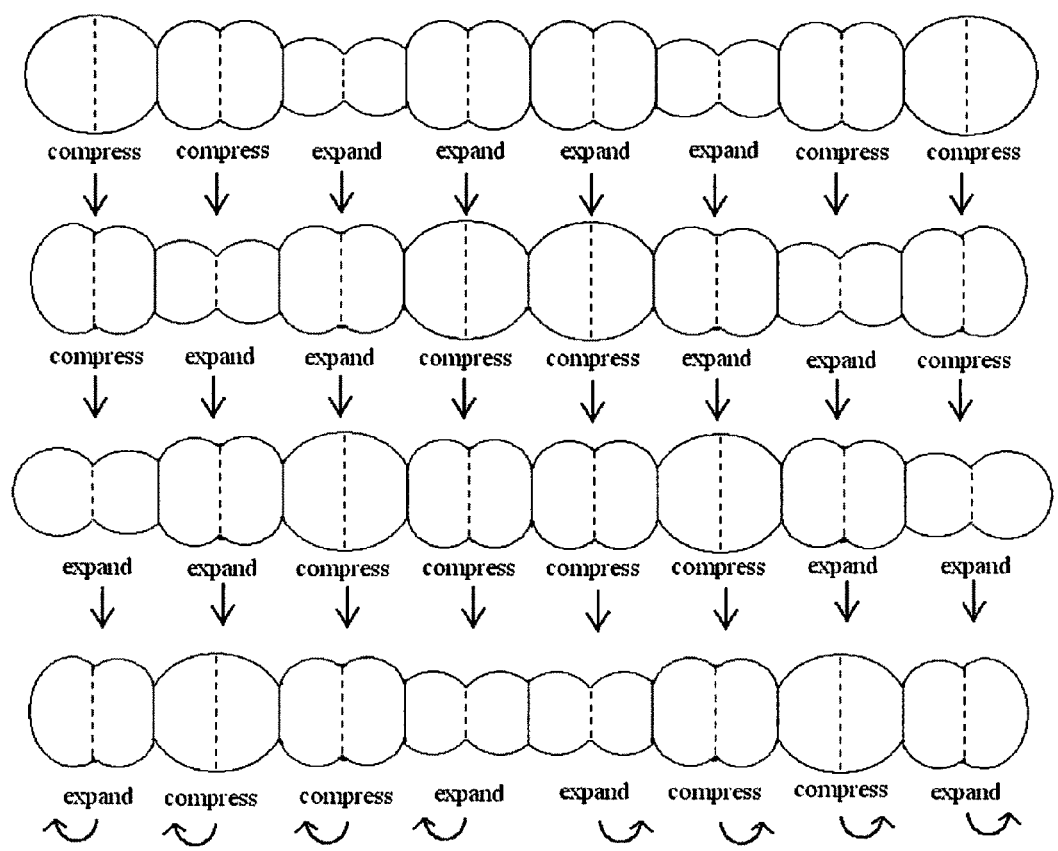

FIG. 3A is a schematic front view of the airship of this invention in fully-inflated condition FIG. 3B is a schematic front view of the airship of this invention in partially-compressed condition FIG. 3C is a schematic front view of the airship of this invention in fully-compressed condition FIG. 4 is a schematic front view of the airship of this invention showing a sequence of compression and expansion of separate volumes.

Figure 5A:
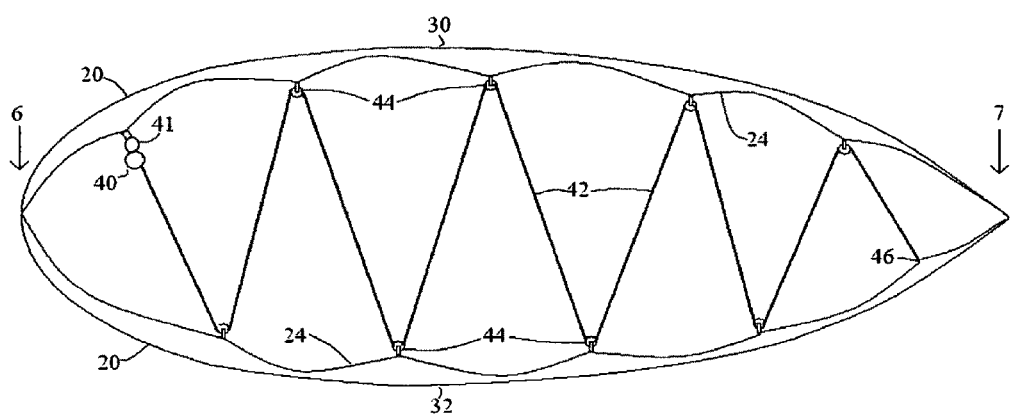

FIG. 5A is a schematic fore and aft cross section view of a lobe of the airship of this invention at its catenary curtains in fully-inflated condition.

Figure 5B:
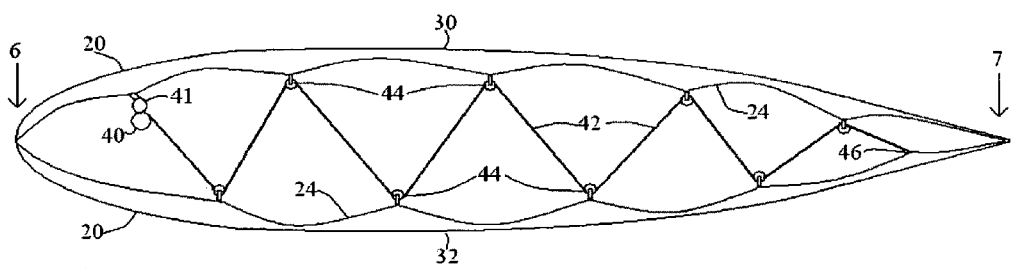

FIG. 5B is a schematic cross section of a lobe of the airship of this invention at its catenary curtains in fully-compressed condition.

Figure 6A:
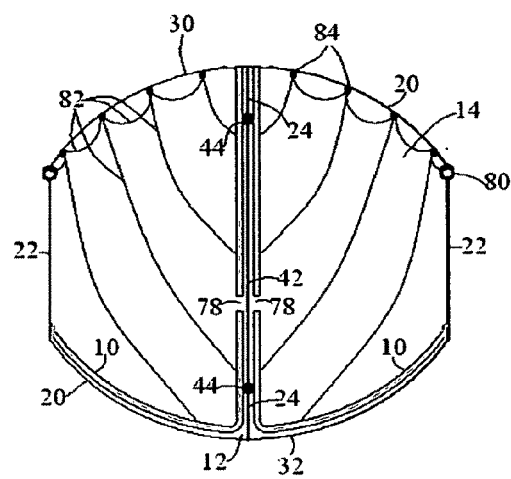

FIG. 6A is a schematic spanwise cross section of a lobe of the airship of this invention in fully-inflated condition with displacer blankets lowered.

Figure 6B:
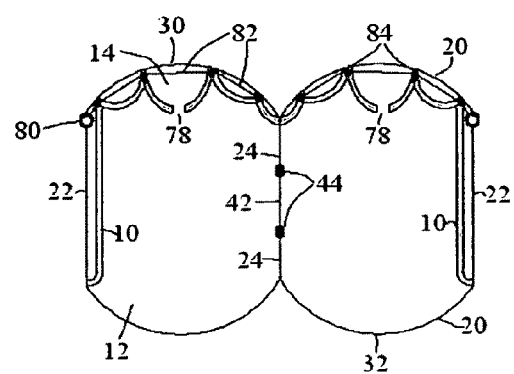

FIG. 6B is a schematic spanwise cross section of a lobe of the airship of this invention in fully-compressed condition with displacer blankets raised.

Figure 7:
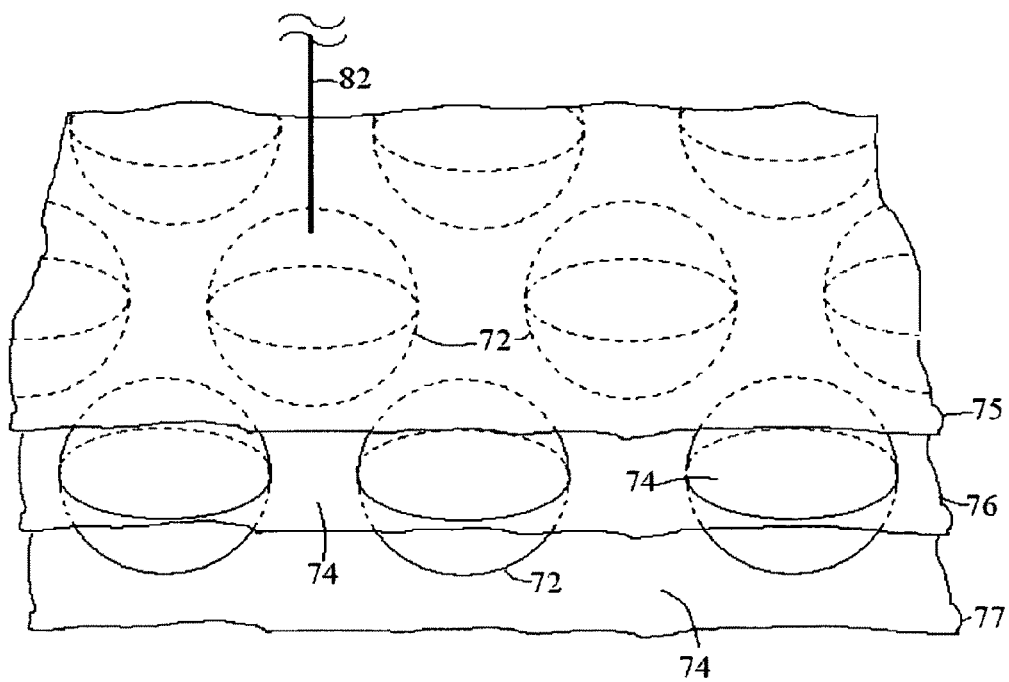

FIG. 7 is a cutaway perspective view of a portion of a displacer blanket of this invention.

Figure 8:
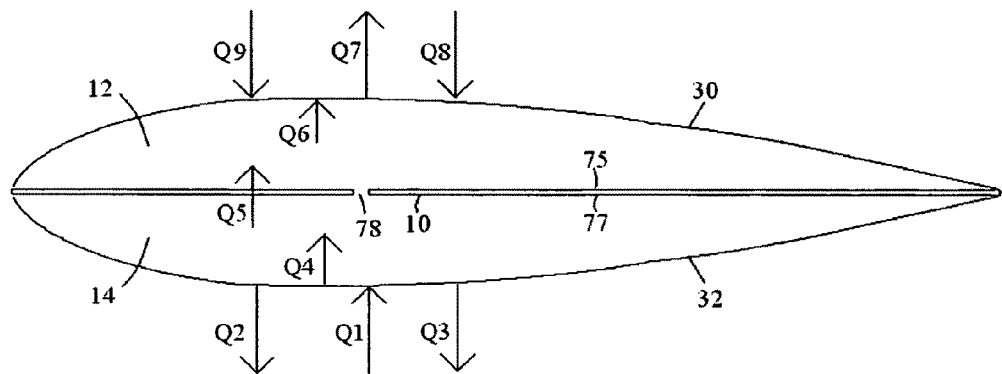

FIG. 8 is a schematic fore-and-aft cross section of a lobe of the airship of this invention showing heat flows into, through and out of the lobe.

Figure 9:
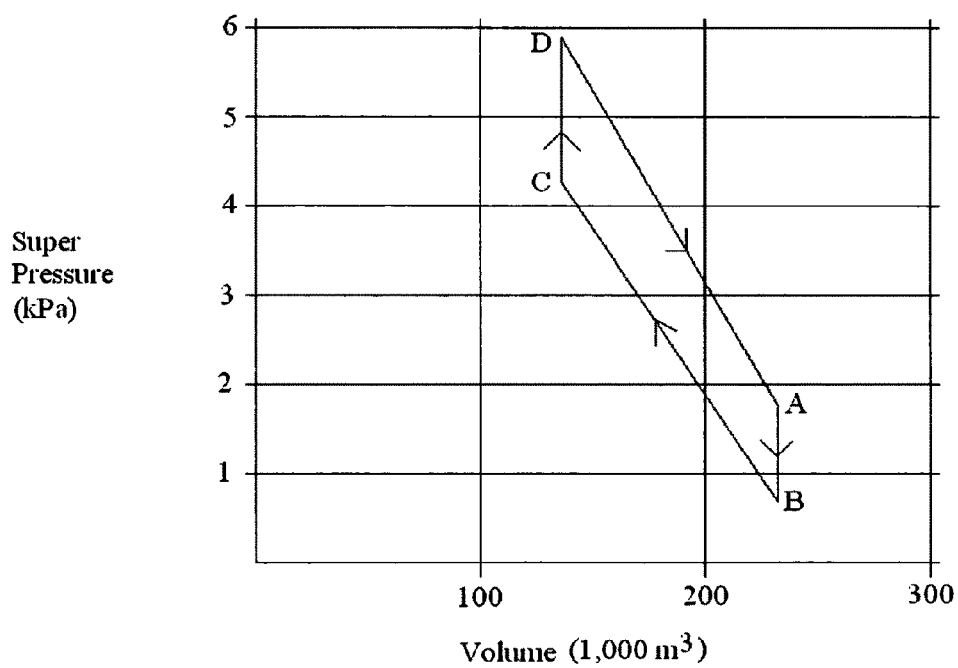

FIG. 9 is a PV diagram showing cyclic changes in super pressure and volume over one cycle of operation of the invention.

REFERENCE NUMERALS IN DRAWINGS 1 surface of the earth
2 airship
3 lobe
6 forward end
7 aft end
8 radiation from earth
9 upper atmospheric radiation
10 displacer blanket
12 warm lifting gas
14 cold lifting gas
20 envelope
22 solid curtain
24 catenary curtain
26 fabric web
28 solar cells
30 top surface
32 bottom surface
40 cable winch
41 reversible motor/generator
42 cable
44 cable pulley
46 anchor point
50 propeller motor
52 propeller
54 hinge
56 strut
72 bubble
74 air
75 upper membrane
76 centering membrane
77 lower membrane
78 port
80 displacer blanket winch
82 displacer blanket cord
84 displacer blanket pulley

DETAILED DESCRIPTION OF DRAWING FIGURES

Figure 1:
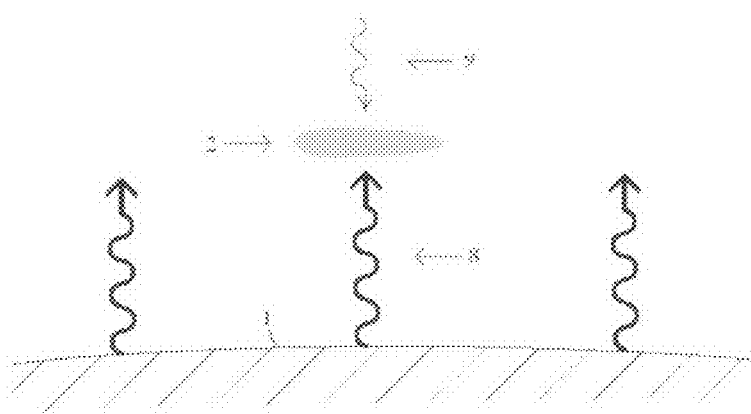
FIG. 1 is a schematic representation of the relative intensity of infrared radiation to an airship during hours of darkness.

FIG. 1 is a schematic representation of infrared radiation to airship 2 from the earth 1 and from the upper atmosphere 9 at night. At a preferred altitude of about 21.5 km above the surface of the earth, radiant energy reaching the bottom surface of the airship is many times greater than the radiant energy reaching its top surface. At that altitude the air temperature is about 217 K; air pressure is about 4.35 kPa; thermal conductivity of the air is of the order of 0.02 W/m K; and thermal conductivity of helium is of the order of 0.1 W/m K. All of those conditions affect the design and operation of the airship embodying this invention.

Preferred Embodiments—FIGS. 2-9

Figure 2A:
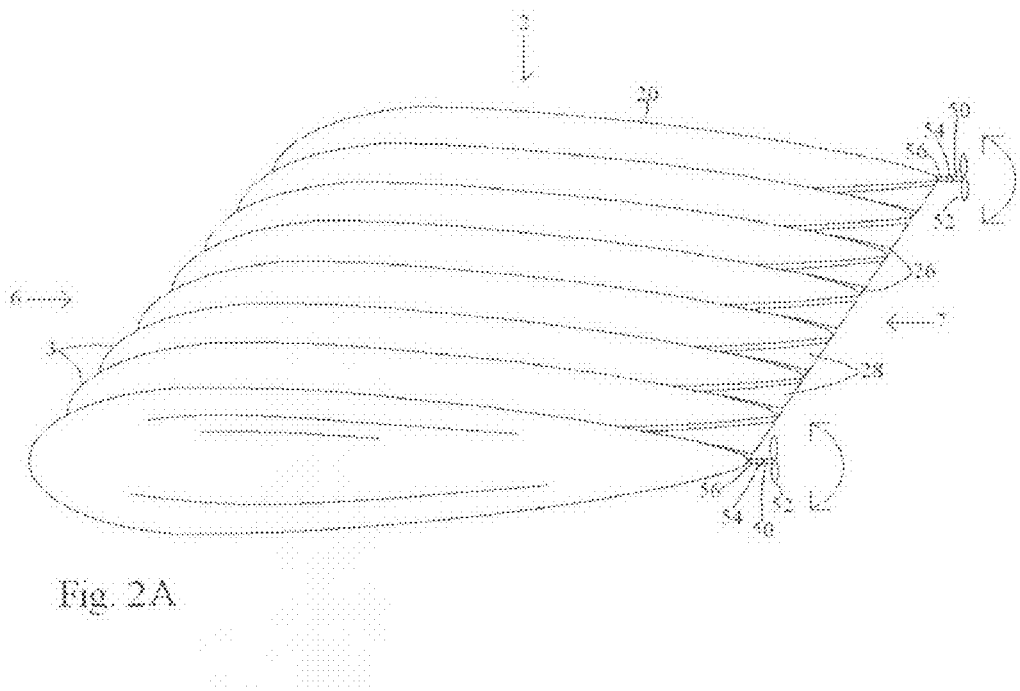
FIG. 2A is a perspective view of the airship of this invention seen from slightly above and slightly behind.

FIG. 2A is perspective view of a preferred embodiment of an airship 2 of this invention, seen from slightly above and slightly behind. The airship is a pressure airship, configured as a flying wing. The lifting gas inside the airship is maintained at a pressure higher than that of the ambient air. The extent to which the pressure inside the airship exceeds the pressure of the surrounding air is called "super pressure." The super pressure in the airship inflates it and generates a level of stiffness of envelope 20 sufficient to maintain the airship's shape in flight.

Figure 2B:
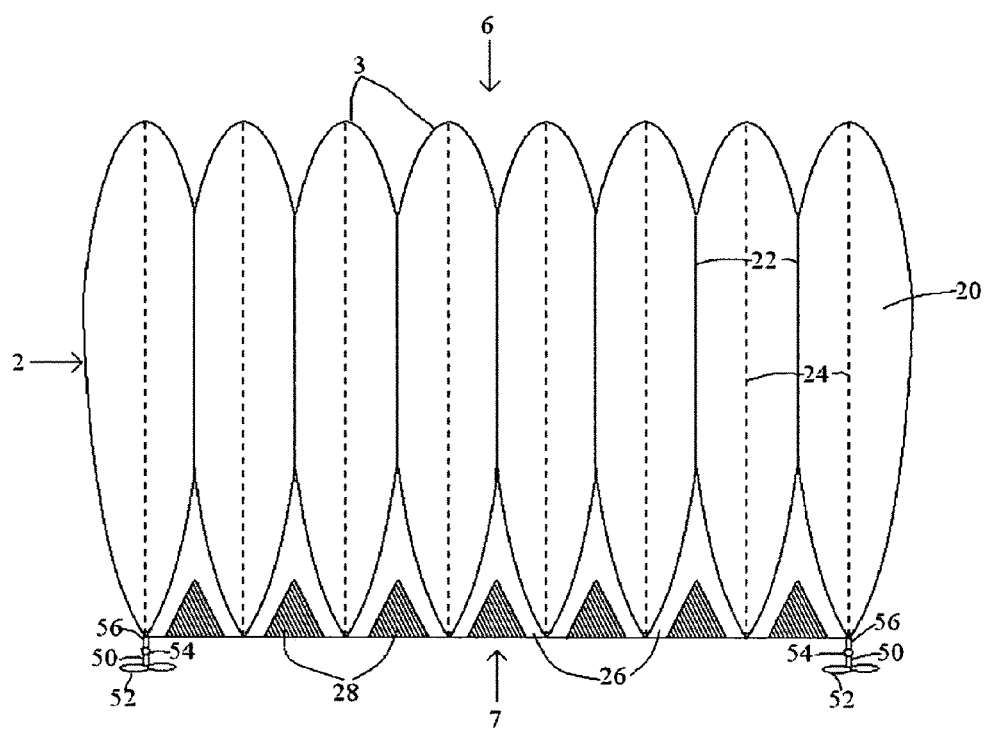
FIG. 2B is a plan view of an airship of this invention as seen from above.

FIG. 2B is a plan view of an airship 2 of this invention, showing the locations of catenary curtains 24 which are attached to inner surfaces of the envelope along the center lines of lobes 3 of envelope 20. The flexible envelope of the airship comprises a multiplicity of separate lobes 3 joined together side by side and separated internally by solid curtains 22. In one preferred embodiment of this invention, solid curtains 22 are permeable to a lifting gas and the variation of volume of each lobe 3 is synchronized. In an alternate preferred embodiment, solid curtains 22 are impermeable to lifting gas, permitting the volume of each lobe 3 to be varied independently of the volumes of other lobes. Each lobe 3 is rounded at the forward end 6 and tapered at the aft end 7 to form an aerodynamic shape. The tapered ends of lobes 3 are connected by webs 26 which may be fabric or plastic film. Solar cells 28 are mounted on webs 26 and connected to the electrical system of the airship (not shown). As shown in FIG. 2B, the planform of the airship is rectangular, but other planforms are possible.

The airship of FIGS. 2A and 2B is equipped with propellers 52 driven by electric motors 50 mounted on struts 56 attached to the trailing edge of the airship at its wing tips. The propellers may be vectored up or down around hinges 54 to provide attitude control in ways known to the airship art. The airship of FIGS. 2A and 2B may be equipped with ballonets (not shown), which may be incorporated in the airship in ways known to the art.

FIG. 3A is a schematic front view of airship 2 of this invention with all its lobes 3 in fully-inflated condition. The upper surfaces 30 and lower surfaces 32 of envelope 20 have assumed their normal curvature with solid curtains 22 under stress but catenary curtains 24 unstressed.

FIG. 3B is a schematic front view of airship 1 of this invention with all lobes 3 in partially-compressed condition. Both solid curtains 22 and catenary curtains 24 are under stress.

FIG. 3C is a schematic front view of airship 1 of this invention with all lobes in fully-compressed condition. Both solid curtains 22 and catenary curtains 24 are under stress. Volume of each lobe 3 is at a minimum.

FIG. 4 is a sequential schematic front view of the airship of this invention illustrating separate cycles of compression and expansion of pairs of lobes 3 of the airship. The pattern of compression and expansion is bilaterally symmetrical to maintain trim around the roll axis of the airship. On each side of the center line of the airship, one lobe is beginning to compress, one lobe is finishing its compression, one lobe is beginning to expand and one lobe is finishing its expansion. With matched pairs of lobes always in different stages of expansion and compression, the aggregate volume of the airship remains essentially constant, allowing continuous flight at the same altitude and continuous generation of electric power to drive propellers.

FIG. 5A is a schematic fore and aft cross section view, at the location of a catenary curtain 24, of a lobe 3 of the airship of this invention in fully-inflated condition. The portion of catenary curtain 24 that is attached to upper surface 30 of envelope 20 is equipped at intervals with cable pulleys 44 that are offset from cable pulleys attached to the portion of catenary curtain 24 that is attached to bottom surface 32 of envelope 20. Cable 42 is laced through cable pulleys 44 from cable winch 40 to anchor point 46. Cable winch 40 is mounted on the portion of catenary curtain 24 that is attached to top surface 30 of envelope 20 near forward end 6. Anchor point 46 is mounted near aft end 7 and may be mounted on either the upper portion or lower portion of catenary curtain 24.

In order to maximize the net output of motor/generators, the entire volume control system, including winches, pulleys and cables should be designed for minimum energy loss in operation. Pulleys should employ low-friction bearings such as ball, roller or needle bearings. The winch should likewise be constructed for minimum friction losses. To minimize energy loss as it flexes over the pulleys, the cable should be in the form of a belt or strap, significantly thinner than it is wide. Because the expansion and compression phases of the thermodynamic cycle of the airship will take place over a significant part of an hour, the motor-generators may be small and the winches highly geared. The pulleys provide additional mechanical advantage. The motor/generators may be wound with superconducting wires and cooled to superconducting temperatures by small cryocoolers, with a substantial reduction in their weight.

FIG. 5B is a schematic fore and aft cross section view, at the location of a catenary curtain 24, of a lobe 3 of the airship of this invention in fully-compressed condition. Cable 42 has been wound up on cable winch 40 bringing cable pulleys 44 mounted on the upper portions of catenary curtain 24 closer to cable pulleys 44 mounted on the lower portions of catenary curtain 24. The cross sections of the airfoils shown in FIGS. 5A and 5B approximate the proportions of the NACA "00" airfoils. The preferred cross section of the airship is an airfoil such as NACA 0018, 0025 or 0035 with the smaller number representing lobes in fully compressed condition and the larger number representing lobes in fully-inflated condition. The NACA "00" series airfoils range in thickness from 6% to 35%. They are preferred because they morph readily from one to the next with changing airfoil thickness and because they have a desirable pitching moment at all angles of attack at which the airship is expected to operate.

FIG. 6A is a schematic spanwise cross section of a lobe 3 of the airship of this invention at approximately mid-chord, in fully-inflated condition with displacer blankets 10 in their low position. Displacer blankets 10 are fastened on one edge along the joints where the upper portion of a catenary curtain 24 meets the top surface 30 of envelope 20. The other edges of displacer blankets 10 are fastened along the joints where solid curtains 22 meet the bottom portion of envelope 20 and directly to the forward and aft ends of the lobes, from the forward and aft ends of solid curtains 22, along the inside of envelope 10. Displacer blanket pulleys 84 are placed at intervals across the inside of the top portion of envelope 20 in both spanwise and fore-and aft directions. Displacer blanket cords 82 are anchored to displacer blanket 10 at corresponding intervals. Displacer blanket cords 82 are connected to displacer blanket winches 80 driven by electric motors (not shown). Displacer blanket winches 80 may be mounted at any convenient location above displacer blankets 10. Additional displacer blanket winches 80, cords 82 and pulleys 84 are distributed at intervals from the forward end to the aft end of each lobe so as to permit the displacer blanket to be raised throughout the length and breadth each lobe 3.

FIG. 6B is a schematic spanwise cross section of a lobe 3 of the airship of this invention at approximately mid-chord in fully-compressed condition with displacer blankets 10 in their raised position. Displacer blanket cords 82 are coiled on cable blanket winches 80 so as to bring displacer blankets 10 as close as practicable to top surface 30 throughout the whole length and breadth of each lobe. Ports 78 in displacer blankets 10 allow lifting gas to pass back and forth through displacer blankets 10 as they are raised and lowered.

Port 78 in displacer blanket 10 permits lifting gas to pass back and forth through displacer blanket 10 as it is raised and lowered. The size of the opening in port 78 should be sufficient to permit lifting gas to pass from one side of the displacer blanket to the other without undue pressure drop considering the rate at which displacer blanket 10 is raised and lowered. A single such port in each displacer blanket is preferred; the use of multiple ports creates a risk of an adverse circulating convective flow up through one port and down through another port while the displacer blanket is in the raised position. Ports 78 may be filled with loosely-packed fiber to minimize convective flows during the time in which displacer blankets 10 remain in their uppermost position.

FIG. 7 is a schematic cross section of a displacer blanket 10 of this invention. The principal constituent of displacer blanket 10 is air 74. Impermeable light weight film, which may be metalized plastic film, forms an upper membrane 75 and a bottom membrane 77 of displacer blanket 10. Bubbles 72, which may be also be fabricated from plastic film, are filled with air and enclosed between upper membrane 75 and bottom membrane 77 of displacer blanket 10. Bubbles 72 are bonded to upper membrane 75 and bottom membrane 77 at their points of contact. Bubbles 72 may be further held in place by centering membrane 76, which may be plastic film, attached to bubbles 72 at their equators. Displacer blanket cords 82 are connected to upper membranes 75, in ways known to the airship art, at points where bubbles 72 contact top membrane 75. The quantity of air confined inside displacer blanket 10 and bubbles 72 is calculated to allow displacer blanket 10 to be fully inflated at the maximum operating pressure of lifting gas at the desired altitude of operation.

FIG. 8 is a schematic illustration of heat transfers generated by radiation to and from airship 1 of this invention, internal heat transfers by convection and conduction, and forced convection between ambient air and the outer surfaces of airship 1. Upper surface 30 radiates heat to space. Upper surface 30 receives a relatively minor amount of incoming radiation from the portion of the atmosphere that lies above its operating altitude. Upper surface 30 is colder than ambient air and is therefore warmed by ambient air as the airship progresses through it. Bottom surface 32 receives heat radiated from the earth and re-radiates heat to the earth. Bottom surface 32 is warmer than ambient air and is cooled by forced convection to ambient air as the airship progresses through it. Below displacer blanket 10, heat is transferred upward from bottom surface 32 to displacer blanket 10 by natural convection. Heat is transferred through displacer blanket 10 by conduction. Heat is transferred from displacer blanket 10 to top surface 30 by natural convection. Heat fluxes affecting the airship at night are identified as follows:

Q1—radiation from the earth and lower atmosphere to the airship;
Q2—radiation from the airship back to the earth;
Q3—external convection from the airship to ambient air;
Q4—natural convection from the lower surface of the envelope to the lifting gas;
Q5—conduction through the displacer blanket;
Q6—natural convection from the lifting gas to the upper surface of the envelope;
Q7—radiation to space from the upper surface of the envelope;
Q8—radiation from the upper atmosphere to the airship;
Q9—external convection to the airship from ambient air.

FIG. 9 is a sample of a pressure/volume ("PV") diagram showing calculated cyclic changes in pressure and volume over one cycle of operation in an entire airship. At point "A", with volume at its night-time maximum, displacer blankets 10 of FIGS. 6A, 6B and 7 are dropped to their lowest position. At point "B" the super pressure has dropped to its lowest value. From point "B" to point "C", volume is reduced and super pressure rises to the value at point "C". At point "C", displacer blankets are raised to their highest position. From point "C" to point "D", lifting gas warms, raising pressure to its highest level. From point "D" back to point "A" cables are unreeled from cable winches, increasing the volume of the airship from its minimum to maximum night-time value. The area of the polygon bounded by "A", "B", "C", and "D" represents the recoverable work output of the cycle. The cycle may be performed with volume changes of all lobes synchronized whether or not the separate lobes of the airship contain discrete volumes of lifting gas. A similar cycle may be performed by each lobe independently of other lobes if each lobe contains a discrete volume of lifting gas; the volume of each lobe will, of course, be a fraction of that shown in FIG. 9.

OPERATION OF THE INVENTION

Night Time Operation

This invention depends for its operation upon cyclic absorption and rejection of heat radiated from the earth to the airship at night. Some of that heat is recovered as mechanical work and some must be radiated from the airship to space. Thus, in order to capture and reject as much heat as possible, it is desirable that the airship have a distinct bottom side that is exposed to the earth below and a distinct top side that is exposed to space. Because the airship must fly into the wind to maintain station, an aerodynamic shape is desirable. For that reason, the preferred embodiment of this invention is a flying wing inflated with a lifting gas such as hydrogen or helium.

In order to absorb heat on its bottom surface and emit heat on its top surface, the outer surface of the envelope of the airship has properties as close as possible to a theoretical "black body." Materials that possess those properties, or that can be coated to possess those properties, are known to the materials art.

There are two alternative preferred embodiments of the invention, of which each has certain advantages not possessed by the other alternative. In a first alternate preferred embodiment, the airship is constructed with a single interconnected volume of lifting gas distributed throughout all of the lobes of the airship. In that embodiment, the volume of the whole airship must be changed at the same time in order to perform the cycle of compression and expansion that generates power, as shown in FIGS. 3A, 3B and 3C. Because the changes in volume produce changes in buoyancy, the airship will be able to progress forward by gliding either upward (if lighter than air) or downward (if heavier than air). In the preferred method of operation, this embodiment of the airship will fly at an altitude where it is neutrally buoyant when fully inflated and will glide downward when it is compressed. In order to compress the whole airship at one time, energy must have been stored, either as it was generated by solar cells during daylight hours or during a previous expansion during hours of darkness. Because the power-generating cycle can be repeated several times during the night, the power storage requirements are smaller than those required to store sufficient solar energy to power the airship through an entire night.

In the second alternative preferred embodiment, each lobe of the airship contains its own discrete volume of lifting gas. Each of those lobes may then be cycled through compression and expansion independently. If some lobes are expanded while other lobes are being compressed, the overall volume and buoyancy of the airship can be maintained constant over time, and the airship will fly at a constant altitude where it is neutrally buoyant. The power being generated by the expanding lobes can be used directly to compress other lobes eliminating the need for energy storage.

In the preferred method of operation of the first alternative preferred embodiment, the airship goes through a cycle throughout hours of darkness as follows:

(1) with the volume of the airship in expanded condition as shown in FIGS. 3A, 5A and 6A and with displacer blankets 10 in the bottom of the airship, most of the lifting gas inside the airship is allowed to cool as heat is radiated from the top surface 30 of the airship to space;

(2) the volume displaced by airship is reduced by reeling in cables 42, using stored energy;

(3) displacer blankets 10 are raised;

(4) the lifting gas inside the airship is allowed to warm as heat radiated from the earth is absorbed by bottom surface 32 of the airship;

(5) the volume displaced by the airship is allowed to expand, generating electric power;

(6) displacer blankets 10 are lowered to the bottom of the airship; and (7) steps (1) through (6) are repeated throughout the night.

In the preferred method of operation of the second alternative preferred embodiment, each separate envelope goes through the same cycle as that executed by the whole airship of the first alternative preferred embodiment. However, the timing of the cycles in the separate envelopes is adjusted so that some of the envelopes are undergoing expansion while other envelopes are being compressed, as shown in FIG. 4. Power generated by the expanding envelopes in step (5) can be used directly to compress the envelopes undergoing compression in step (2). The excess power is used to power the propellers of the airship, or its electronic payload, or both. The cycles of envelopes on opposite sides of the center line of the airship are synchronized to maintain balance in the roll axis as shown in FIG. 4.

The thermodynamic cycle employed by both the first and second alternative preferred embodiments of this invention resembles the Stirling cycle in the sense that a confined fluid is alternately compressed when relatively cool and expanded when relatively warm. That is accomplished in the airship, as in a Stirling engine, through use of a displacer that alternately forces the lifting gas into the relatively cool upper part of the airship and into the relatively warm lower part. Both alternate preferred embodiments of the airship differ from a conventional Stirling cycle engine in that they have no explicit regenerators between the warm and cold spaces. Regenerators would improve performance, but their weight would be large relative to the lifting capacity of an airship at operating altitude. For that reason, both preferred embodiments of this invention omit regenerators. Eliminating the regenerator increases cycle time but not to a prohibitive extent.

Both alternate preferred embodiments of this invention also differ from most Stirling engines in that the mechanisms that generate volume change are operated independently of the mechanisms that move the displacers. That is, electrically-driven displacer blanket winches raise and lower the displacer blankets while separately-controlled cable winches compress and expand the lifting gas. That permits an efficient sequence of pressure and volume changes, with temperature changes occurring at constant volume, and volume changes occurring at constant temperature, to produce a sharp-cornered pressure/volume relationship approximately as shown in FIG. 9.

Heat transfer through displacer blankets is adverse; it warms the lifting gas that is to be cooled and cools the lifting gas that is to be warmed. However, the thermal conductivity of air is a fraction of the thermal conductivity of either hydrogen or helium. Moreover, at a thickness of a meter or two, the displacer blanket does not allow enough room for significant natural convection to develop in the air confined in it. Thus, the displacer blanket acts as a thermal insulator between upper and lower chambers of the airship.

This invention is practical, in part, because the thermal conductivities of candidate lifting gases are several times greater than the thermal conductivity of air. Thermal conductivity of a gas affects heat transfer in conditions of both forced and natural convection. As a consequence, adverse external heat transfers between ambient air and the outer surfaces of the airship is less effective than beneficial heat transfer by natural convection in the lifting gas inside the airship at altitudes of interest.

Daylight Operation

During daylight hours, solar cells 28 as shown on FIGS. 2A and 2B generate electric power for propulsion and for operation of payload systems such as radar or data reception and transmission. During daylight hours, the temperature of the airship rises above its temperature at night. That rising temperature tends to cause the lifting gas to expand, raising super pressure. To minimize the extent of that rise in temperature, and the corresponding rise in super pressure, the displacer blankets may be raised to their uppermost position. The helium in the space above the displacer blankets will then become warm, but most of the lifting gas will remain below the displacer blankets and will stay cooler than the lifting gas above the displacer blankets. At daybreak, as the airship begins to warm up in the sunlight, the airship may be permitted to expand to its maximum size, generating electricity in the process of expanding.

As the airship is driven through the air during daylight hours, it will reject heat to the ambient air by forced convection and to space and to the earth by radiation. In that manner, a temperature equilibrium can be obtained at a pressure within the pressure limits of the envelope of the airship.

Control

Airspeed, the timing of the movements of displacer curtains and timing of expansion and compression of the lifting gas may be controlled by reference to pressures and temperatures in the airship in ways known to the process control art.

Maneuvering

Trim of the airship may be accomplished by vectoring the propellers of the airship, or by filling and emptying ballonets (not shown), or by combinations of both methods, in ways known to the airship art. Turns may be accomplished by running one propeller faster than the other. Control systems for autonomous unoccupied aerial vehicles based upon global positioning satellites or star sights are well known to that art.

Payload Stowage

A typical payload for the airship may comprise a number of modular electronic components, each of relatively small size and weight. Those modular components may be distributed over the airship and attached to its envelope either inside or outside, as convenient, in ways known to the airship art. A preferred arrangement is to stow such modules in pockets in the envelope accessible from outside and sealed with flaps of fabric that attach to the edges of the pockets with hook and loop fasteners. To the extent that different parts of the payload must communicate with each other, they can be cabled together or connected by wireless transmissions in ways known to the electronics arts. Because the electronic components for contemplated applications of the airship are relatively small, their bulk will not interfere significantly with the aerodynamics of the airship (if attached externally) or the operation of the displacer blankets and cable winches (if attached internally).

ADVANTAGES

By harvesting energy radiated from the earth at night and rejecting that energy by radiation to space, the airship of this invention can generate electric power to drive propellers. In that way, the airship can maintain forward progress at night. In a first alternate preferred embodiment, only the energy storage capacity required to store power generated in one cycle of compression and expansion is required and a portion of the required forward motion can be obtained by gliding. Since the energy-harvesting cycle can be repeated a number of times during the night, that energy storage capacity can be a fraction of the energy storage capacity that would otherwise be required.

In a second alternate preferred embodiment, night flight imposes no energy storage requirement at all. By staggering the compression/expansion cycles of a number of separate volumes of lifting gas, the buoyancy of the airship can be maintained substantially constant, allowing flight at a single altitude level with neutral buoyancy, driven entirely by propellers.

The movable, insulating displacer blankets inside the airship of this invention can be moved to their topmost position during daylight hours, thus insulating the lifting gas from heating by the sun and preventing excessive super pressure that would otherwise build up inside the airship during daylight hours.

This invention provides means for propelling an airship at night without recourse to electrical energy generated during daylight hours and stored for later use. As a consequence the array of solar cells on the airship can be smaller and lighter than it would be if it were required to generate power for night operations as well as operations during hours of sunlight.

This invention provides a structure for an airship in which several lobes with a relatively small radius of curvature substitute for a single gas bag with a larger radius of curvature. By decreasing the radius of curvature of the envelope of the airship, hoop stress on the fabric of the envelope is reduced, allowing use of thinner and lighter envelope materials.

CONCLUSIONS, RAMIFICATIONS AND SCOPE

The airship of this invention can be used for a wide variety of purposes. Its size, shape and operating altitude can be varied to suit a wide variety of needs. It may be configured as shown as a flying wing but other configurations that permit the volume of the airship to be varied in flight are likewise possible.

Although the description above contains many specifics, these should not be construed as limiting the scope of the invention but merely as providing illustrations of some of the presently preferred embodiments of this invention. Thus, the scope of this invention should be determined by the appended claims and their legal equivalents, rather than by the examples given.

I claim:

1. In a pressure airship containing a lifting gas, an improvement comprising:
    a flexible envelope;
    a top outer surface of said flexible envelope that is highly emissive of infrared radiation;
    a bottom outer surface of said flexible envelope that is highly absorptive of infrared radiation;
    means for varying the volume displaced by said airship;
    displacer blanket means disposed inside said flexible envelope; and
    means for moving said displacer blanket means between a position near the top inner surface of said flexible envelope and a position near the bottom inner surface of said flexible envelope.

2. The airship of claim 1 wherein said airship is configured as a flying wing.

3. The airship of claim 1 wherein said means for varying the volume displaced by said airship comprise a reversible motor/generator, a winch, a cable, and a catenary curtain.

4. The airship of claim 1, wherein said displacer blanket means comprise
    an upper membrane,
    a layer of air, and
    a lower membrane
    and wherein said layer of air is confined between said upper membrane and said lower membrane.

5. The displacer blanket means of claim 4 wherein said displacer blanket means further comprise air-filled bubbles disposed between said upper membrane and said lower membrane.

6. A method of operating an airship of claim 1 during hours of darkness comprising steps of:
    (1) with the volume of the airship in expanded condition and with said displacer blanket at a location near the bottom of said airship, permitting said lifting gas inside said airship to cool;
    (2) reducing the volume displaced by said airship;
    (3) raising said displacer blanket means to a location near the top of said airship;
    (4) permitting said lifting gas inside said airship to warm;
    (5) permitting the volume displaced by said airship to expand;
    (6) lowering said displacer blanket means to a location near the bottom of said airship; and
    (7) repeating steps (1) through (6).

7. The method of claim 6 wherein said airship is heavier than air during step (4) and wherein the attitude of said airship is adjusted to permit said airship to glide forward as it descends.

8. The method of claim 6 wherein said airship is lighter than air during step (1) and wherein the attitude of said airship is adjusted to permit said airship to glide forward as it ascends.

9. The method of claim 6 wherein work of expansion done in step (5) is recovered as electrical energy.

10. In a pressure airship, an improvement comprising
a plurality of flexible envelopes attached to one another;
means for separately varying the volumes displaced by said flexible envelopes;
displacer blanket means disposed inside said flexible envelopes; and
means for moving said displacer blanket means between positions near the top inner surfaces of said flexible envelopes and positions near the bottom inner surfaces of said flexible envelopes
wherein
each of said flexible envelopes contains a separate quantity of lifting gas;
the top outer surface of at least one of said flexible envelopes is highly emissive of infrared radiation; and
the bottom outer surface of at least one of said flexible envelopes is highly absorptive of infrared radiation.

11. The airship of claim 10 wherein said means for varying the volumes displaced by said envelopes comprise reversible motor/generators, winches, cables, pulleys and catenary curtains.

12. A method of operating an airship of claim 10 during hours of darkness comprising cycling each of said flexible envelopes through steps of:
(1) with the volume of a flexible envelope in expanded condition and with a displacer blanket in the bottom of said flexible envelope, permitting the lifting gas inside said flexible envelope to cool;
(2) reducing the volume displaced by said envelope;
(3) raising said displacer blanket to the top of said envelope;
(4) permitting the lifting gas inside said envelope to warm;
(5) permitting the volume displaced by said envelope to expand;
(6) lowering said displacer blanket to the bottom of the envelope; and
(7) repeating steps (1) through (6).

13. The method of claim 12 wherein at least one of said flexible envelopes is performing step (2) while another of said flexible envelopes is executing step (5).

14. The method of claim 12 wherein at least one of said flexible envelopes is performing step (1) while another of said flexible envelopes is performing step (4).

15. The method of claim 12 wherein work of expansion done in step (5) is recovered as electrical energy.

* * * * *